US011791767B2

(12) United States Patent
Roeloffs

(10) Patent No.: US 11,791,767 B2
(45) Date of Patent: Oct. 17, 2023

(54) BRUSH-SUPPORTED SOLAR CELL WASHING SYSTEM AND METHOD

(71) Applicant: Justin Roeloffs, Tipton, CA (US)

(72) Inventor: Justin Roeloffs, Tipton, CA (US)

(*) Notice: Subject to any disclaimer, the term of this patent is extended or adjusted under 35 U.S.C. 154(b) by 44 days.

(21) Appl. No.: 17/714,798

(22) Filed: Apr. 6, 2022

(65) Prior Publication Data

US 2022/0345080 A1 Oct. 27, 2022

Related U.S. Application Data

(63) Continuation-in-part of application No. 16/808,875, filed on Mar. 4, 2020, now Pat. No. 11,616,469.

(51) Int. Cl.
*H02S 40/10* (2014.01)
*B08B 3/04* (2006.01)
*B08B 3/02* (2006.01)

(52) U.S. Cl.
CPC .............. *H02S 40/10* (2014.12); *B08B 3/024* (2013.01); *B08B 3/04* (2013.01)

(58) Field of Classification Search
CPC ...................................... H02S 40/10
See application file for complete search history.

(56) References Cited

U.S. PATENT DOCUMENTS 10,305,419 B1 5/2019 Shugar

FOREIGN PATENT DOCUMENTS

ES 1074781 6/2011

*Primary Examiner* — Jason Y Ko
(74) *Attorney, Agent, or Firm* — WILLIAMS KASTNER & GIBBS PLLC; Mark Lorbiecki

(57) ABSTRACT

A method and washer head assembly for washing a surface of a solar panel, includes lowering a washer head frame onto a solar panel. The washer head frame includes a washer frame cross member having a swivel mounted thereon. The swivel is mounted below a center of gravity. The frame includes a upper frame rail and a lower frame rail. A plurality of lath brushes together extend, generally, the length of the washer head frame. The lath brushes are made up to include a plurality of bristles being of sufficient number to support the washer head frame against the surface of the solar panel without damage to the solar panel. The lightness of the frame and the resilience of the brush bristles assure that the washer head frame will not come into damaging contact with the solar panel.

20 Claims, 9 Drawing Sheets

BRUSH-SUPPORTED SOLAR CELL WASHING SYSTEM AND METHOD

FIELD OF THE INVENTION

The method and system sets forth a means for washing solar cells in arrays and, specifically, the use of brushes to support a washing frame and to dislodge blocking detritus on the surface of the cells.

BACKGROUND OF THE INVENTION

Airborne particles and their accumulation on solar cells are cutting energy output by more than 25 percent in certain parts of the world. Atmospheric particulate matter deposited on solar panel surfaces reduces solar energy transmittance actually reaching the photovoltaics. Just as a solar cell in the shade will not produce as much electricity as one in direct intense sunlight, each particle on the surface of the solar cell places that part of the cell beneath it in the shade diminishing the output of the cell. The more particulate or dust residing on the surface of the solar cell, the smaller the area of the cell that is exposed to sunlight and, consequently, the less power that cell produces.

Worldwide solar energy production is expected to increase more rapidly than any other energy source into the middle of this century, especially in regions furthest from hydroelectric resources which, coincidentally, also experience high levels of dust including large areas of India, China, and the Arabian Peninsula. Results indicate that solar energy production is currently reduced by ~17-25% across these regions. Particulate matter is responsible for ~1 and ~11 GW of solar power reduction in India and China, respectively, underscoring the large role that particulate matter plays in reducing solar power generation output wherever it is allowed to rest on solar cell surfaces.

Studies indicate that for solar panel surface cleanings that occur every 20-30 days, power generation increases by on average ~50% after each cleaning. Past studies have shown that wind-blown dust deposited on solar panels can influence solar panel performance by decreasing the amount of energy reaching the photovoltaics. But, as in all matters where economics must be considered, one must balance the cost of cleaning against the gains to be enjoyed when the cells have been cleaned.

The current solution for washing photocell arrays have been impaired by the extremely sophisticated control solutions that are necessary for positioning washing heads on solar panels. These hydraulic actuators must be controlled to avoid cataclysmic contact with the cell. The danger of injury to the solar panels is so great that the controllers of such conventional washers often exploit proximity sensors such as sound waves to range the solar cell surface. In short, the washing head is massive and positioned to hover just above the surface of the cell such that the scope of a rotating brush's bristles graze the surface which motivates dust off of the surface to be rinsed away in a spray of water and soap in solution.

An example of such a device is described in U.S. Pat. No. 10,305,419 issued to Daniel Shugar on 28 May 2019. With the number of sensors and the massive hydraulic actuators, the center of balance shifts as the head is moved outward or inward from the carrying vehicle. Such massive devices are carried on vehicles which must be counter-balanced or stabilized to prevent that mass from upsetting the vehicle and allowing the head to crash into the solar cell. Solar panels often contain lead, cadmium, and other toxic chemicals that cannot be removed without breaking apart the entire panel. "Approximately 90% of most photovoltaic modules are made up of glass," notes San Jose State environmental studies professor Dustin Mulvaney. "However, this glass often cannot be recycled as float glass due to impurities. Common problematic impurities in glass include plastics, lead, cadmium and antimony." Researchers with the Electric Power Research Institute (EPRI) undertook a study for U.S. solar-owning utilities to plan for end-of-life and concluded that solar panel "disposal in regular landfills [is] not recommended in case modules break and toxic materials leach into the soil" and so "disposal is potentially a major issue." So, any collision between the head and solar cell is an extremely dangerous event and to be avoided.

What is needed in the art is a different type of washing vehicle wherein the balance of the vehicle is not upset by the deployment of the washing head.

SUMMARY OF THE INVENTION

A method and washer head assembly for washing a surface of a solar panel includes lowering a washer head frame onto a solar panel. The washer head frame includes a washer frame cross member having a swivel mounted thereon. The swivel is mounted below a center of gravity. The frame includes a upper frame rail and a lower frame rail. A plurality of lath brushes together extend, generally, the length of the washer head frame. The lath brushes are made up to include a plurality of bristles being of enough to support the washer head frame against the surface of the solar panel without damage to the solar panel. The lightness of the frame and the resilience of the brush bristles assure that the washer head frame will not come into damaging contact with the solar panel.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Distinct from the approach taken by the prior art, rather than to exploit heavy hydraulic actuators and such vast and heavy heads to perform the washing of a surface of a solar array 1, the present invention relies upon a lightweight washer head assembly 10. In use, the lighter assembly is sufficiently supported by the bristles of the several lath brushes to transit a surface of a solar cell without injury either to the solar cell or the supporting structure. These same lath brushes are used to scrub clean the surface of the solar cells that make up a solar panel. Because the number and area of the brushes is selected to distribute the weight of the head over a large region of the surface of the solar panels 3 that make up a solar array, no particular part of the surface must support a large localized vertical force. In this way, the washer head functions in a manner analogous to snowshoes which work by distributing the weight of the person over a larger area so that the person's foot does not sink completely into the snow, a quality called "flotation." In a similar manner, the extreme lightness of the washer head assembly 10, the inventive pulley system, and the balance imparted by eschewing hydraulics as a means of support of the head assembly, allow the floating head assembly to clean the solar panels 3 with sufficient pressure to dislodge dust while never imparting a localized pressure to fracture the solar panel 3.

Figure 1:
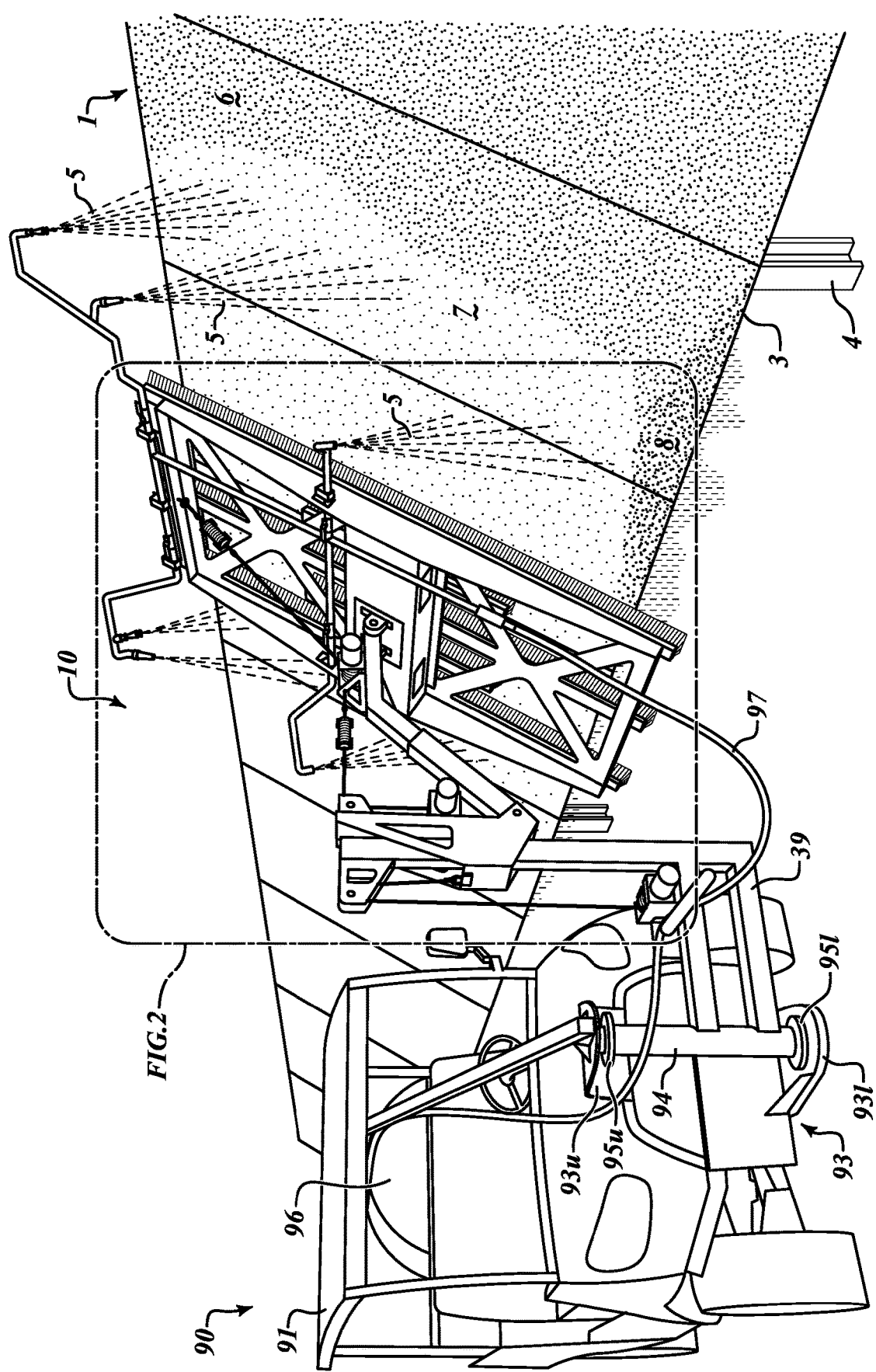
FIG. 1 is a perspective view of an inventive washer head assembly mounted on a host vehicle.

Referring to FIG. 1, the inventive washer represents two distinct elements, i.e. the washer head assembly 10, and the host vehicle assembly 90, which serves both to transport and position the washer head assembly 10 and to present a platform for all hardware that can be separated from the washer head assembly 10, while necessary to allow the washer head assembly 10 to accomplish its purpose of washing the solar panels 3.

In order to place the washer head assembly 10 in proper context, the discussion starts at the host vehicle assembly 90. By way of example, any vehicle such as a pickup truck, tractor, utility jeep, or even a golf cart may advantageously be used as the host vehicle 91. There is no specific requirement such as size or specific equipment apart from the availability of motive power, either electrical or hydraulic to operate winches, of which more will be said later. But, it is most important that the host vehicle 91 be heavy enough to provide a stable platform from which the washer head assembly 10 can extend without its weight oversetting the host vehicle 91.

In the presently preferred embodiment, a 2019 Kubota® RTV-X1100C is selected as a non-limiting exemplary vehicle and belongs to a class of vehicles known as all-terrain vehicles (ATVs). The ATV has found many uses in agriculture as a substitute for pick-up trucks, horses, and even walking. When first appeared in the United States in the 1970s, they were promoted and sold as a recreational vehicle designed to provide "thrills" for the rider. Riders soon realized that ATVs are useful machines to move through areas not accessible with pick-up trucks, four-wheel drives or other motorized vehicles, and the ATV became a popular hunting vehicle. Because solar panel arrays can be placed on land not otherwise suitable for agriculture, either because of grade or lack of irrigation, a solar cell array 1 may be economically sited on rugged land. For any maintenance operations on such lands, an ATV with a coil spring shock absorber system, an automatic clutch, reverse gear, shaft drive, and a differential with a locking mechanism offers the versatility for all forms of maintenance allowing the ATV to serve multiple roles on the solar farm. The availability of a power take-off may be desirable for some repair and maintenance tasks. For example, apart from serving as the host vehicle 91, the ATV can serve to transport replacement panels where storms many have damaged a single or several panels. A power take-off might optionally serve to power devices used to elevate and place the panels in maintenance.

While the exemplary ATV enjoys the extreme stability afforded by independent double A-arm suspension and the surefooted drive being selectably employed in either 4×2 or 4×4 configuration, one important facet of the Kubota® ATV is its dimensions for fitting into aisles the solar cell array 1 defines. With a length of 122.5 inches or a bit over ten feet and a width of just over four feet, the Kubota® can easily fit between the rows of panels. With its narrow stance, the ATV can sneak between anchoring pillars that make up each row's solar panel support structure 4. Exploiting a 1123 cc diesel motor producing 24.8 horsepower and 50.3 ft-lbs. of torque through a variable hydrostatic transmission, the host vehicle 91 can readily climb while transporting the weight of the washer head assembly 10. Four-wheel disc brakes, independent front suspension and power steering lifts it easily into the realm of a full-size utility vehicle for ease of handling—and its wide tires and 7.5" ground clearance makes it suitable for tough terrain. The cargo bed, large enough to carry a four-foot pallet and strong enough to lift 1100 pounds of weight, lifts and dumps via a hydraulic bed-lift system operated by a single lever.

Module tilt and selection of row spacing determine the peak power a site can produce, as well as how effectively that translates into energy for the owner. By optimizing module tilt and spacing, system designers can improve a project's cost structure by over 10%, improving the profit margins and in some cases making an unattractive project profitable. But, where suitably selected, the aisles between the rows of panels can be laid out with little or no area given over to accommodate those aisles. The aisles might, in the optimal configuration, be arranged to reside in the perennially shaded areas between the rows of solar panels 3. In use, the solar panels 3 arranged in a row closer to the sun, cause the casting of a shadow behind the solar panels 3 where the row can be situated without giving up any power-generating area behind the solar panels 3.

The basic tradeoff is straightforward: for a given area, a system engineer must determine how many modules to install. One approach is to maximize the productivity of the modules: set the tilt to maximize the sunlight each module receives, and space them far apart so they don't shade each other. However, this will leave a lot of empty space on the area of solar farm and result in a smaller system. The other extreme is to pack the modules closer together and reduce the tilt (and thus, the shading). This results in a much larger peak power capacity, but the modules are less productive individually. Other vehicles can readily be used to maintain the solar farm and to serve as host vehicle to the washer head assembly 10. For purposes of this discussion, then, an ATV is presumed though not to the exclusion of other vehicles to serve as host vehicle 91.

As stated above, one objective of the invention is to move as much of the hardware effecting the cleaning function off of the washer head assembly 10 and onto the host vehicle 91. To that end, the host vehicle 91 is selected to carry one of the heaviest (as opposed to the most dense) elements necessary in the cleaning task. To understand how this density is an overwhelming factor, one needs only to understand how a small tank, when filled, can represent a great deal of weight in a water reservoir 96.

One US gallon of water weighs approximately 8.34 lbs. (simplified in the old saw: "a pint is a pound the whole world round"). If one uses a commonly available elliptical tank (i.e. a tank having an elliptical cross-section common in agricultural applications), selecting one with a 30" width, a 44" length, and a 31.3" height would have a capacity of 110 gallons. Such a 110 gallon tank weighs 917.4 pounds. For this reason, a desirable placement of nearly one half ton of weight dictates the centering of that weight low and between the four wheels. Such a placement contributes to stability of the host vehicle 91 in moving a full water reservoir 96. Because the water reservoir 96 contains such water as is needed to clean the solar panels 3, a communicating pressurized water line is used to move water from the water reservoir 96 to the surface of the solar panel 3. The use of the water will be discussed with reference to the operation of the washer head assembly 10 generally below.

As discussed above, however, the host vehicle 91 serves, not only as the residence for water, but also as the means of transporting the washer head assembly 10. In order to clean contiguous solar panels 3, the desired movement of the washer head assembly 10 relative to the surface of the solar panel 3 is in a direction parallel to the surface of the solar panel 3. Thus, one readily perceives that vehicle motivates the washer head assembly 10 in a direction parallel to the orientation of a row of solar panels 3 that make up the solar cell array 1. There are only two positions that place the washing head assembly 10 parallel to the path of the host vehicle 91 and these are to the right (starboard) and left (port) side. (The maritime terms of orientation are used here to prevent confusion between movement in a direction either to the left or to the right and an unambiguous and fixed location relative to the vehicle itself (port side or starboard side)). Because an economical use of the vehicle dictates that each passage through the rows is a cleaning passage (a reasonable assumption as no one mows their lawn by alternating a cutting pass and then a recovery pass; instead, the "lazy mower" assures that each pass is a cutting pass regardless of direction). Thus, the meaningful movement of the washer head assembly 10 is right from port side and left to starboard side. There is no useful position between the port and starboard use positions. Thus, the preferred connection between the host vehicle 91 and the washer head assembly 10 is one that allows transition from port to starboard or starboard to port. Ideally, the connection will also provide detents at each of the port and starboard operation positions as the intermediate positions are not useful except in transition from one to the other.

There are several solutions that are all within the scope of this invention. For example, sockets might be provided for insertion of a framework into either of the port or the starboard side of the vehicle holding the washer head assembly 10 either to extend from the port side to extend from the starboard side. In use, the driver would, at the end of each row, unfasten the washer head assembly 10 from either the port side or the starboard side and then to install the washer head assembly 10 on the opposite side of the host vehicle 91. While this is an embodiment of the invention, it is not the preferred embodiment. The host vehicle 91 lends no support to the washer head assembly 10 during the transition. It relies upon the driver to carry the washer head assembly 10 from one side to the other.

In the presently preferred embodiment, the transition from port to starboard or starboard to port is accomplished by rotating the washer head assembly 10 from port to starboard without disconnecting the washer head assembly 10 from the host vehicle 91. The rotational movement from port to starboard or starboard to port is very similar to the rotation of a bicycle fork to steer a bicycle. Throughout the range of movement, the fork must support the weight of the bicycle and the rider. Thus, in the presently preferred embodiment, the washer head assembly 10 is affixed to a pivot tube 94 supported by a vehicle having a vehicle bracket assembly 93 comprising a vehicle upper bracket 93u and a vehicle lower bracket 93l. To enable rotation, the pivot tube 94 is floated on a lower bearing 95l and captured on by bearing on an upper bearing 95u. The pivot tube 94 is free to rotate as required from starboard to port and port to starboard.

While not visible in FIG. 1, some embodiments of the invention include two detents that prevent the pivot tube 94 from rotating within the vehicle bracket assembly 93. In one embodiment, the pivot tube 94 is drilled to define a hole that extends through the pivot tube into and through a rod within that connects the vehicle upper bracket 93u to the vehicle lower bracket 93l. A pin, such as a toggle pin, clevis pin, clevis lock pin, push button quick release or other known conventional pin, is inserted through the defined hole fixing the pivot tube 94 relative to the vehicle upper bracket 93u and the vehicle lower bracket 93l. As described, this clevis pin arrangement will allow the pivot tube 94 to be locked into each of two positions: port and starboard, and removal of the clevis pin will allow the rotation of the pivot tube 94 from the one to the other position.

A similar detent can be employed where the pivot tube includes a pivot tube flange and one or the other of the vehicle upper bracket 93u and the vehicle lower bracket 93l includes a bracket flange. Holes drilled in the flanges will allow a similar locking arrangement and can be arranged to lock the pivot tube in each of two positions for optimal positioning of the washer head assembly.

Still other detent systems are available. In one embodiment, catches are placed that capture the pivot tube 94 and is held in place by these catches. Once the washer head frame 13 is in either of the port or starboard position, the pivot tube 94 is held in that position by the operation of either of the corresponding port or starboard catch. Once the catch holds the swinging gate mast frame 39 in place, the washer head assembly 10 is fixedly oriented in space allowing the washer head frame 13 to be lowered safely onto the solar panel 3.

In another embodiment, no detent is necessary to prevent rotation. Contact with the solar panel prevents rotation of the pivot tube 94 relative to the vehicle bracket assembly 93. The presently preferred embodiment allows a freely rotating pivot tube 94 to mount the washer head assembly 10 upon the host vehicle 91 at a vehicle bracket assembly 93. It is the presently less preferred embodiment wherein the pivot pin prevents rotation of the pivot tube 94 within the vehicle bracket assembly 93. In the preferred embodiment, the bearings 95u and 95l cooperate to support the pivot tube 94 allowing rotation moving the washer head assembly 10 between port and starboard operating positions.

Figure 2:
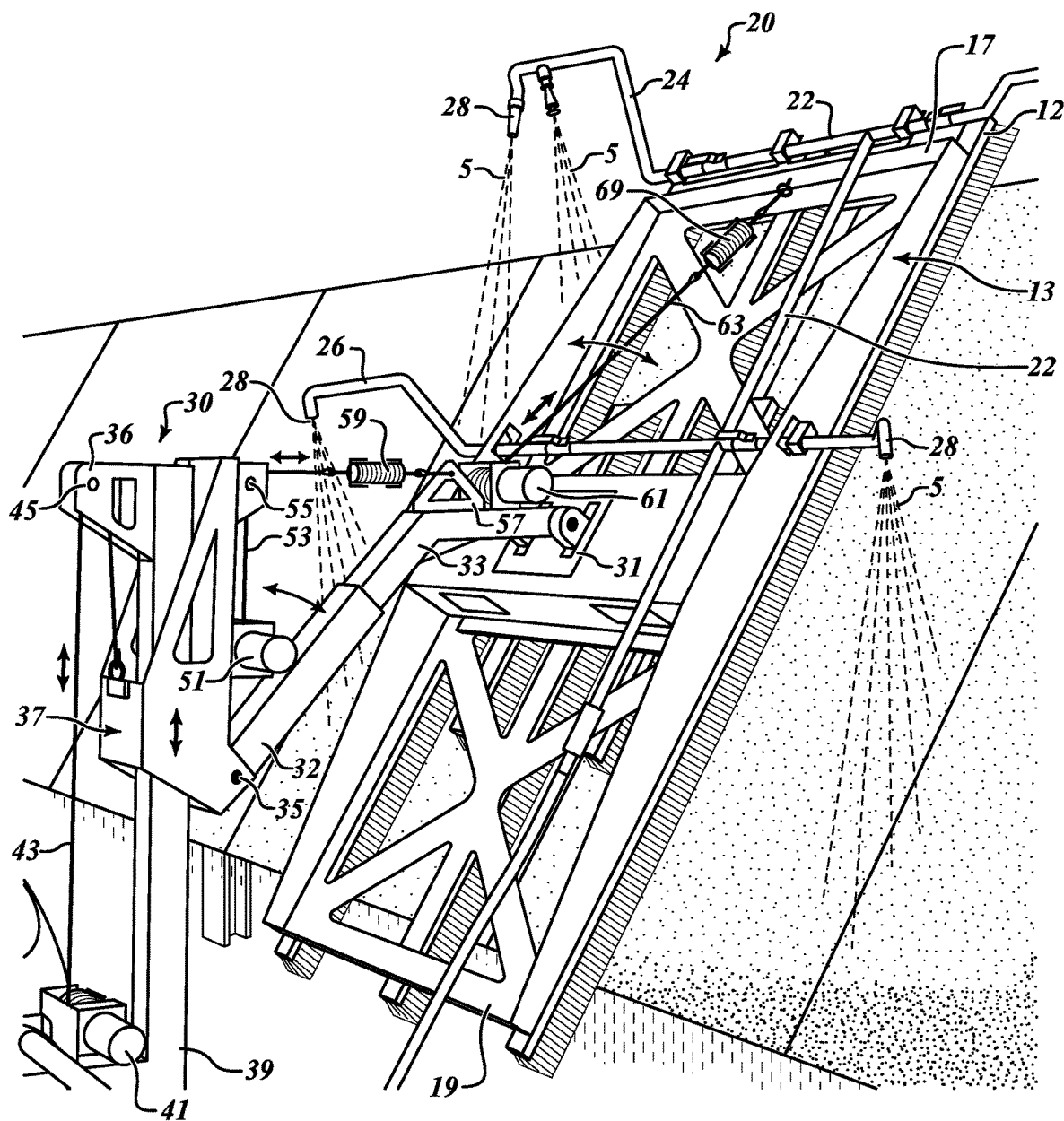
FIG. 2 is a detail of the inventive washer head assembly.

Moving on to FIG. 2, the washer head assembly 10 is explored. For purposes of this discussion, to locate elements, this description sets out the washer head frame 13 which includes a upper rail 17 and a lower rail 19 defining upper and lower extreme edges. One of the features of the instant invention is that heavier hydraulic actuators are eschewed in favor of the far lighter rigging exploiting cables and blocks to lift and place the washer head assembly 10. In a similar manner, the washer head frame 13 is constructed as the central structure onto which the operative elements are attached. In the presently preferred embodiment, aluminum makes up the structure of the washer head frame 13. Today aluminum alloys and carbon fiber are the most common frame materials for such an application, but steel, magnesium or titanium frames might also provide rigid structure without undue weight.

There exist certain factors that will dictate the selection and construction methods and dimensions. Such factors include:

Fatigue: The weakening of a material when subjected to repeated stress or cyclic loading; and Fatigue life: The number of load cycles required for a material fail.

As stated, an aluminum frame is presently preferred. An aluminum frame is an affordable embodiment both in terms of ease of manufacture and a price of material than other alternative embodiments. High quality alloys are easy to procure and manipulate into a quality washer head frame 13; density is the main advantage of aluminum as a frame material. Given its strength and stiffness, a sufficiently strong frame weighs the same or less than a steel counterpart. Corrosion resistance is another big advantage of aluminum over steel. Aluminum can be used or stored in adverse conditions even without the benefit of a paint or lacquer finish. A steel frame requires both a finish and a greater attention to propagation of rust. While the application generally does not subject the frame to an extreme stress cycle, fatigue life is a factor in the selection and design. As aluminum flexes and shifts, it fatigues and eventually hits its limit. Good design and sufficient attention assure longer life.

Another alternate embodiment is a carbon fiber washer head frame 13. Carbon fiber is composite laminate made up of tiny fibers suspended into a resin. A well-made carbon fiber washer head frame 13 can be built stiffer, stronger and lighter than an aluminum, steel or titanium. Carbon fiber is nearly half as dense as aluminum and much stronger for the weight. Carbon fiber is extremely customizable. It can offer different characteristics when carbon tubing is made many plies, or layers, of fibers that are placed in different orientations. Stiffness and flexibility can be manipulated on different planes of the same tube to offer huge advantages over all other materials.

Flexible strength and fatigue life is the biggest disadvantage a carbon fiber washer head frame 13 presents. Carbon fiber is a very rigid material that doesn't like to be flexed and bent. As well, much flexing causes cracks and fissures in the structure and exposes the individual fibers which aren't so strong by themselves. The failure of the base structure can cause sudden, catastrophic failure of the washer head frame 13 and with such a failure, possible endangerment of the solar panel 3 that might underlie the washer head frame 13. Nonetheless, proper engineering may obviate the concerns about fatigue life. There are few instances where repeated extreme stresses are applied to the washer head frame 13.

Because of the widespread availability and the long history of use in industry, steel is both the most available and its formation techniques are the best known. Engineering steel frames for lightness is possible, but to achieve the ends of the invention, understanding that if steel is used, care must be taken to remove any surplus material. The washer head frame 13 can be formed of steel tubes which are smaller in diameter than aluminum. The thinner tubes flex more and allow the washer head frame 13 to conform more completely to the surface of the solar panel 3. Fatigue life of a steel tube is nearly twice that of aluminum, so a steel washer head frame 13 can last much longer under heavy use. As with aluminum, steel comes in varied qualities, from heavy core steel that has no place in the inventive washer to high-quality steel tubing properly configured to the end use.

Titanium is twice as dense as aluminum but almost half as dense as steel. Fatigue life and tensile strength are titanium's strong points. Titanium fabrication is more labor intensive than steel, aluminum, or carbon fiber. Fabrication requires more care and more time to cut and weld in a safe, lasting manor. Titanium can be extruded into long, thin tubes that are lighter and stronger than steel. Butted and swaged tubes offer a lot of customization to place material where such will address stress and minimize fatigue. Price is the main disadvantage of titanium. The process of extracting the metal is expensive and power intensive. Forming it is also more expensive. But, like aluminum a frame of titanium resists corrosion, even to a greater extent than aluminum. While each material has its advantages, there is nothing except resulting lightness of the formed frame that dictates selection of one material over the others. Though, if a frame can be suitably fabricated from any material with sufficient strength and lightness, such a washer head frame 13 is suitable for ends of the invention.

In operation, the washer head frame 13 rests upon an array of lath brushes 12. The lath brush 12 is the most common and widely used brush shape and style. A lath brush 12 consists of a rectangular or square shaped brush back. Lath brushes 12 are versatile rectangular shaped brushes and can be configured in numerous combinations of brush fill, density and tuft pattern. Other embodiments might be constructed on a synthetic, wood, aluminum or steel core into which tufts of fill material are machine stapled, resin-set or hand wire drawn into the core.

Lath brushes 12 are, advantageously, configured with varying bristle angles across the brush, and, in some embodiments, with water-fed holes. Lath brush blocks can also be designed and machined with the mounting holes for ease, ready to assemble and attach to the washer head frame 13, thereby allowing ready replacement with wear. A lath brush 12 of such a design is the easiest and most cost-effective brush to design and to manufacture. So formed, given the availability of a comprehensive range of synthetic, natural hair, fiber, bristle or mixed materials and can be selected to minimize any abrasive damage to the surface of the solar panel 3.

The lath brushes 12 are also economical. A variety of lath brushes 12 may be selected to support and to spread the weight of the entire washer head assembly 10 across the surface of the solar panel 3, again, so as not to damage that solar panel 3. The lath brushes 12 are of a design of the sort suitable for the wet cleaning of large glass areas such as windows, mirrors and doors. By way of non-limiting example, lath brushes 12 may, alternatively, be founded in an injection-molded polypropylene brush back to minimize the brush's weight. In one embodiment, such a design is achieved with structural foam, which is light but retains the brush's strength and durability. Advantageously as well, lath brushes 12 may be manufactured by the most economical means using CNC technologies as well robotically operated, industrial-brush-making machines. Advantageously, lath brushes 13 are to be had at a relatively small price even to the extent of being very readily task-designed.

In the presently preferred embodiment, as illustrated, three lath brushes 12 extend from the upper rail 17 to the lower rail 19, the length of the washer head frame 13. These three lath brushes 12 are located one on each of the port and starboard extremities and on in the center of the frame 13. The washer head frame 13 is designed to be bilateral symmetric which advantageously allows the washer head assembly 10 to traverse the surface of the solar panel 3 with equal facility in either direction. In this illustrated embodiment, two additional half-length lath brushes 12 are positioned immediately beneath a centrally located washer frame cross-member 15. The two half-length lath brushes 12 are positioned parallel to the full-length brushes thereby orienting them perpendicular to the direction of travel across the solar panel 3 and positioned to bisect the horizontal distance between each of the extreme full-length lath brushes 12 and the center lath brush 12. The purpose of such placement is less to meet the cleaning needs that the washer head frame 13 is configured to meet, than to assure that any contact between the washer head frame 13 and the solar panel 3 is suitably buffered by the presence of additional bristles where the washer head assembly 10 is least able to absorb impact by rotation about the suspending connection. In short, the additional bristles within the half-length lath brushes 12 cooperate with those of the full-length lath brushes 12 to act as a bumper might on a car to absorb impact without permanent damage to the solar panel 3.

As earlier expressed, a pressurized water line 97 supplies water for washing to the washer head assembly 10. The water line 97 makes the connection between the water reservoir 96 to a sprayer manifold 22. The sprayer manifold 22 is a construction of pipes branching the flow of water from the water line 97 to multiple nozzles 28 positioned to spray a flow of water onto the solar panel 3 to rinse accumulated dust from its surface. The criteria for selecting the nozzles 28 are two-fold: 1) the impact efficiency of spray water, which represents the capability for removing contaminants, and 2) the uniformity of the shape of the water spray at the nozzle tip, which determines the uniformity of cleaning performance. According to the data sheets provided by the manufacturer, the impact efficiency of the flat-type nozzle at 50° is 10%, whereas those of the full-cone and hollow-cone-type nozzles are <1% and 1%, respectively. The spray shape uniformity is determined by the nozzle type and the designated pressure. The flat-type nozzle displays higher spray uniformity with a fan shape and is the most widely used type of nozzle for cleaning. In addition, it displays a higher impact efficiency than that of the hollow-cone- or full-cone-type nozzle.

The sprayer manifold 22 is rigidly affixed to the washer head frame 13 at the upper rail 17 providing both fixation and structure for a water sprayer manifold assembly 20. The water sprayer manifold assembly includes, extending from the upper end of the sprayer manifold 22 each of a port and starboard spray header 24. These headers 24 position the nozzles 28 relative to the washer head frame 13, the washer head frame 13 positioning the washer head assembly 10 relative to the solar panel 3 in use. Thus, the sprayer headers 24 are designed to position, each, two distinct nozzles 28, in the presently preferred embodiment but there is nothing in the nature of the invention to dictate more or fewer nozzles 28 supported by each of the headers 24. As well, in the presently preferred embodiment, the sprayer manifold 22 supplies port and starboard nozzles 28 through sprayer goosenecks 26 that position and fix nozzles 28 that cover the remainder of a swath configured to cover the whole of a vertical stripe that precedes on one side, port or starboard, and succeeds on the opposite side the passage of the brushes. In another embodiment, the manifold also supplies water holes (not illustrated) in the brush back of lath brushes 12 in accord with the object of the invention. The water holes mentioned above allow water to "weep" upon the surface of the solar panel 3 in use augmenting the flow from the nozzles 28 to assure that the bristles may move across the surface of the solar panel 3 thereby to minimize or eliminate scratching thereof in use.

As stated above, the washer head frame 13 is supported at its washer frame cross-member 15 by a spar assembly 30 at a swivel 31 centrally affixed to the washer frame cross-member 15. The spar assembly 30 comprises an extendable boom 32 that fastens to the swivel 31 in a manner to allow one degree of freedom, specifically so as to allow the washer head frame 13 to tilt forward and backward (to pitch) but is held fixed relative to the remaining degrees of freedom, i.e. disallowing moving up and down (elevating or heaving); moving left and right (strafing or swaying); moving forward and backward (walking or surging); swiveling left and right (yawing); and pivoting from side to side (rolling). In the illustrated example, the extendable boom 32 is formed to include a boom dogleg 33 to assure a junction with the swivel 31 that more closely such that a distal portion of the boom 32 approximates a horizontal orientation to allow the swivel 31 to hingedly orient the washer head frame 13 to lie parallel to the surface of the solar panel 3 as it resides thereon.

The remainder of the spar assembly 30 includes a sliding mast traveler 37 having a boom heel gooseneck 35. The boom heel gooseneck 35 duplicates the single degree of feed the swivel 31 allows, specifically to allow the boom 32 to tilt forward and backward (to pitch). The sliding mast traveler 37 is also configured to travel vertically on a swinging gate mast frame 39. It is the swinging gate mast frame 39 that is affixed to the pivot tube to allow a single degree of freedom. In this case, the pivot tube moves by swiveling left and right (yawing), i.e. the pivot tube is allowed to transit from the port side operating position to the starboard side operating position or from that of the starboard side to that of the port side as has been described above relative to the pivot tube 94. The spar assembly 30 serves as the rigid members of a derrick-like member for placing the washer head frame 13 with the bristles of its several lath brushes 12 to rest on the surface of the solar panel 3. The specific actions of this spar assembly 30 are described below in detail relative to motivating rigging and winches.

It is the rigging and winches that accomplish articulation and translation of the rigid members of the spar assembly 30 in order to move the washer head assembly 10 relative to the host vehicle 91. Three winches are responsible for drawing or settling the above described extendable boom 32, the sliding mast traveler 37, and for controlling the yaw of the washer head frame 13. Beginning with the sliding mast traveler 37, a traveler halyard winch 41, draws a traveler halyard 43 downward through a traveler halyard sheave 45 rotates within a mast crosstree 36 mounted uppermost on the swinging gate mast frame 39 such that the traveler halyard 43 draws the sliding mast traveler 37 upward and with it lifting the boom heel gooseneck 35. To lower the boom heel gooseneck 35, the traveler halyard winch 41 pays out the traveler halyard 43. In such a case, gravity draws the sliding mast traveler 37 downward which draws the traveler halyard 43 through the traveler halyard sheave 45 in the opposite direction as lifting. As such, the movement of the sliding mast traveler 37 likewise translates the washer head frame 13 upward and downward relative to the host vehicle 91.

As expressed above, the boom heel gooseneck 35 pivotally connects the extendable boom 32 to the sliding mast traveler 37. A boom winch 51 mounted on the traveler 37, achieves articulation of the boom 32 relative to the traveler 37. The boom winch 51 draws a boom pendant 53 through a boom pendant sheave 55. The boom pendant 53 is affixed to the boom 32 by means of a boom crank 57 such that drawing the boom pendant 53 draws the boom 32 to rotate upward about the boom heel gooseneck 35. Paying out the boom pendant 53 allows gravity to draw the boom 32 downward, rotating about the boom heel gooseneck 35. Optionally, a boom pendant drawbar spring 59 is used to buffer the actions of the boom pendant 53 as it accelerates and decelerates the movement of the boom 32 and, necessarily, the washer head frame 13. Even the lighter mass of the inventive washer head frame 13 still must overcome inertia and douse momentum as the boom 32 is rotated. Physics will not be denied.

A special type of extension spring, known as a drawbar spring, has a solid stop. A drawbar spring is essentially a compression spring with special hooks. In a drawbar spring, the load is applied at the ends of long steel loops which pass through the spring's center and are hooked around the opposite end, thus compressing the spring upon loading. As the loops are extended one from the other, the hooks compress the spring until, at the end of the range, the coils of the spring bear against each other to stop further movement in that direction. When fully compressed, the spring acts as a link in a chain until the loops can move back together relaxing the compressed spring. These springs do not fail upon overloading. Drawbar springs are excellent for use in potential overload situations and offer a built-in safety feature that, upon fracturing, will continue to carry a static load.

Thus, when, optionally, used to buffer the movement of the boom 32 by using the boom winch 51 by hauling in or paying out of the boom pendant 53, the boom pendant drawbar spring 59 inhibits sudden movement of the boom 32 that might cause impact with the solar panel 3. Because the bristles of the lath brushes 12 also serve as bumpers to spread impact forces the washer head frame 13 imparts when making contact with the solar panel, the boom drawbar spring 59 serves to further cushion that impact by taking up tension as the bristles of the lath brush 12 come to rest and, by flexure, begin to exert support for the washer head frame 13 against the solar panel 3. The length and resiliency of the lath brush 12 bristles provides a continuum from just making contact to full support. With the boom drawbar spring 59 also exerting a tensioning upon the boom pendant 53, the length of the boom pendant 53 paid out is maximized during that transition.

Moving, then, from the boom pendant 53, the attitude of the washer head frame 13 is controlled, in part, by a jib pendant 63. As stated above, the extendable boom 32 fastens to the swivel 31 in a manner to allow one degree of freedom, specifically to allow the washer head frame 13 to tilt forward and backward (to pitch) but is held fixed relative to the remaining degrees of freedom. So, a jib pendant 63 extends from a jib winch 61, In the presently preferred embodiment, the jib winch 61 is mounted on the boom 32. The opposite end of the jib pendant 63 is affixed to the washer head frame 13 above the swivel 31 such that drawing in the jib pendant 63 draws the washer head frame 13 to a pitch that approaches vertical. Because the swivel 31 is located below the washer head frame 13 center of gravity, paying out the jib pendant 63, from the jib winch 61 allows the washer head frame 13 to approach a pitch nearer to horizontal.

Because the swinging gate mast frame 39 is positioned to be perpendicular to the horizontal edge of the solar panel 3, the jib winch 61 can be employed to orient the washer head frame 13 to a parallel orientation to the solar panel 3. In that parallel orientation, the washer head frame 13 is lowered to the solar panel by paying out the boom pendant 53 as described above. By coordinating the operations of the jib winch 61 and boom winch 51, the washer head frame 13 can be landed on the solar panel 3 with minimal impact. Once the washer head frame 13 has made contact, both of the jib pendant 63 and the boom pendant 53 are allowed to go slack, each with a slight excess so that no pressure can be exerted on the solar panel in movement across the surface allowing the slight pitching in the washer head frame 13 should any be necessary to conform with the surface of the solar panels 3 in the washer head frame's 13 transit across the solar panels 3.

Once the washer head frame 13 rests upon the solar panels 3, water issues from the nozzles 28 as pumped from the water reservoir 96 through a pump (not shown). The host vehicle 91 moves down defined aisles parallel to the solar panels 3 as they are arranged in rows. As the vehicle moves forward, the same bristles on the lath brushes 12 now both support washer head frame 13 and scrub the solar panels. The spray of the water through the nozzles 28 that strikes the solar panels 3 ahead of the lath brushes 12 loosens dust and provides water to lubricate the individual bristles prevent scratching the solar panels 3 in their movement over the surface. As the dust is loosened by the scrubbing action of the bristles as the lath brushes 12 pass over the solar panels 3. Finally, water issuing from the trailing nozzles 28 rinses the loosened dust from the solar panels so that it may run off the surface thereby cleaning the solar panel 3.

Figure 3:
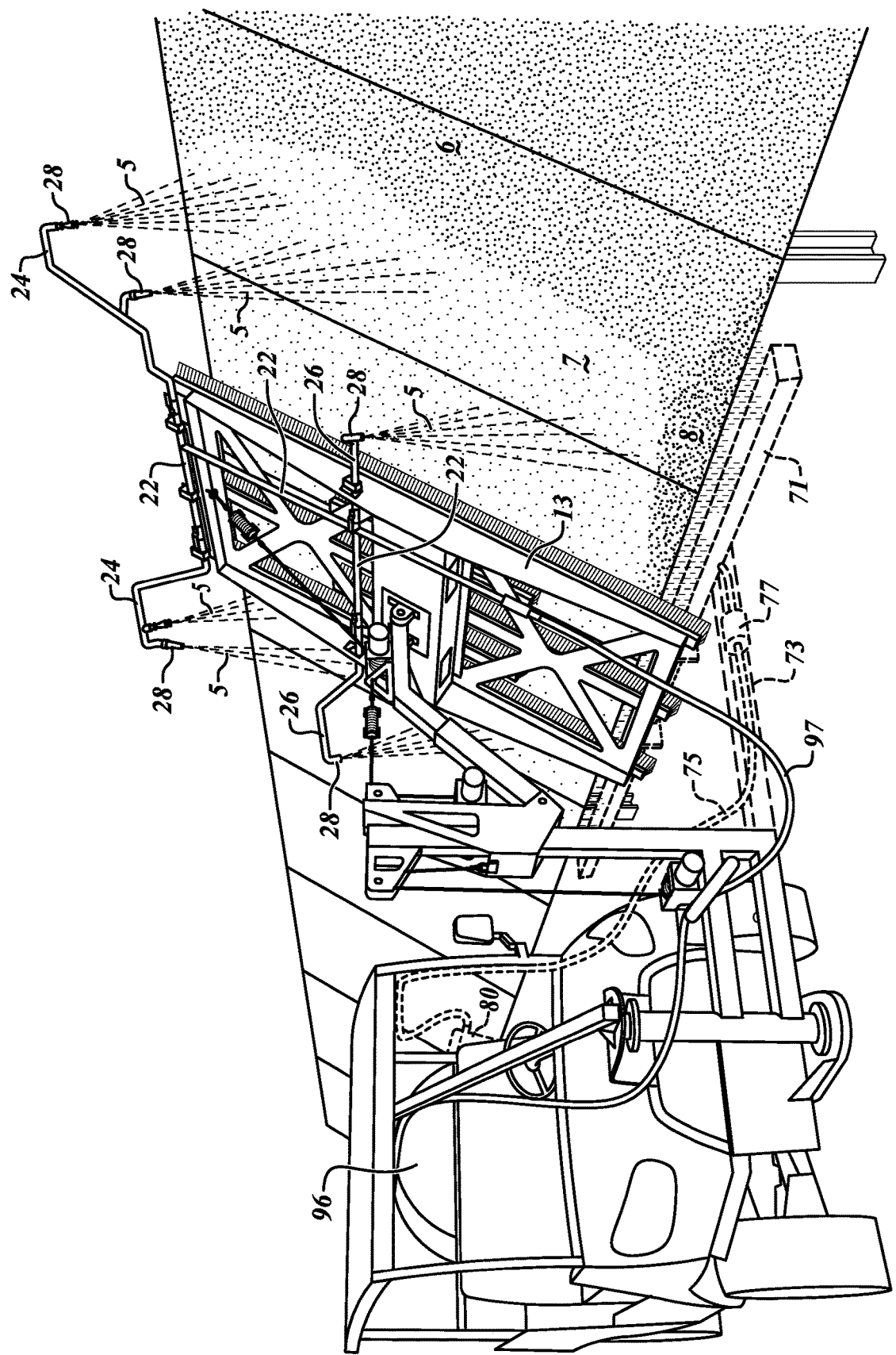
FIG. 3 is a perspective view of the inventive washer head assembly mounted on the host vehicle and including an optional water recovery system.

Referring now to FIG. 3, it is worthwhile to trace the path of such water through the inventive solar panel washer. As shown, a vented water reservoir 96 resides on the cargo deck of the host vehicle 91. While not shown, a pump draws water from the water reservoir 96 to pressurize water in a water line 97 to supply the washer head assembly 10 where the water line 97 joins a sprayer manifold 22 which distributes water among a pair of spray goosenecks 26 which supply pressurized water for spraying through nozzles 28 mounted on each and a spray header 24 which supplies, in this embodiment, another four nozzles 28. Acting in concert, then, the six nozzles 28 spray water to completely wet each of two roughly rectangular bands, each being sprayed by three nozzles 28. One of the two bands immediately precedes the washer head frame 13 and its lath brushes 12 and one immediately follows the washer head frame 13. As described above, the host vehicle 91 propels the washer head frame 13 to scrub the solar panels as the nozzles 28 spraying the preceding band wets the solar panel 3 and dust accumulated thereon, the washer head frame 13 to scrub the now wetted surface of the solar panel 3 and then the nozzles 28 spraying the following band rinse the now-loosened dust from the surface of the solar panel 3.

In many instances, the embodiment of the invention shown in FIG. 1 is wasteful of water in places where solar panels are advantageously located by the strength of the sun striking the earth in that location. For instance, in desert locations, water might be extremely valuable for irrigation purposes and the getting of a volume of water sufficient to clean the solar panels with the embodiment depicted in FIG. 1 might be prohibitive. For that reason, the alternate embodiment optionally includes a water recovery tray 71 to catch such water as might be recovered from the spraying and to separate that water from the entrained dust.

In the embodiment set out in FIG. 3, all of the elements set out in FIGS. 1 and 2 are present. Further, a water recovery tray 71 depends from the swinging gate mast frame 39 by means of a water recovery tray bracket 73. In the presently preferred embodiment, to aid in the stability of the host vehicle 91 with the washer head assembly 10, it is extremely advantageous to remove the water and, hence, its weight, from the water recovery tray 71. So, in operation, a water recovery pump 77 draws what water collects in the water recovery tray 71 from the tray 71 and pumps it through a water recovery return line 75. In such presently preferred embodiment, there is a screen that protects the pump from such grit and non-dust debris as may have rested on the solar panel 3. For example, bird excrement may contain grit, undigested seeds and husks. A bird swallows small bits of gravel that act as 'teeth' in the gizzard, breaking down hard food such as seeds and thus helping digestion. These stones are called gizzard stones or gastroliths and usually become round and smooth from the polishing action in the animal's stomach. When too smooth to do their required work, they may be excreted or regurgitated. Among other debris, should these gastroliths be impelled into the pump impeller, the hardness of the gastroliths will greatly accelerate the wear of the pump 77. For that reason, though not shown, the tray 71, in a preferred embodiment, with include a screen or grid to strain these gastroliths and other debris, thereby protecting the pump 77. But, even after straining, the water will still entrain the dust that was deposited on the solar panels 3.

The water recovery pump 77 motivates the water recovered from the water recovery tray 71 through the water recovery return line 75 to a hydrocyclone 80 to remove all of the dust while harvesting the water for reuse by return to the vented water reservoir 96. Because the washing of solar panels does not require that water be returned or, even, conditioned as potable water, it needs only to be relatively in a state free from corrosive chemicals and dust or debris so as to protect the solar panel 3 which it washes. In fact, in some embodiments, the water recovery return line 75 may be used to draw washing water from standing surface water from ponds or lakes for washing. The pump 77 enables such collection. But, in the presently preferred embodiment, a hydrocyclone 80 proves to be very usable to remove dust from the retrieved water, exploiting the kinetic energy the pump 77 imparts to the retrieved water.

Figure 4:
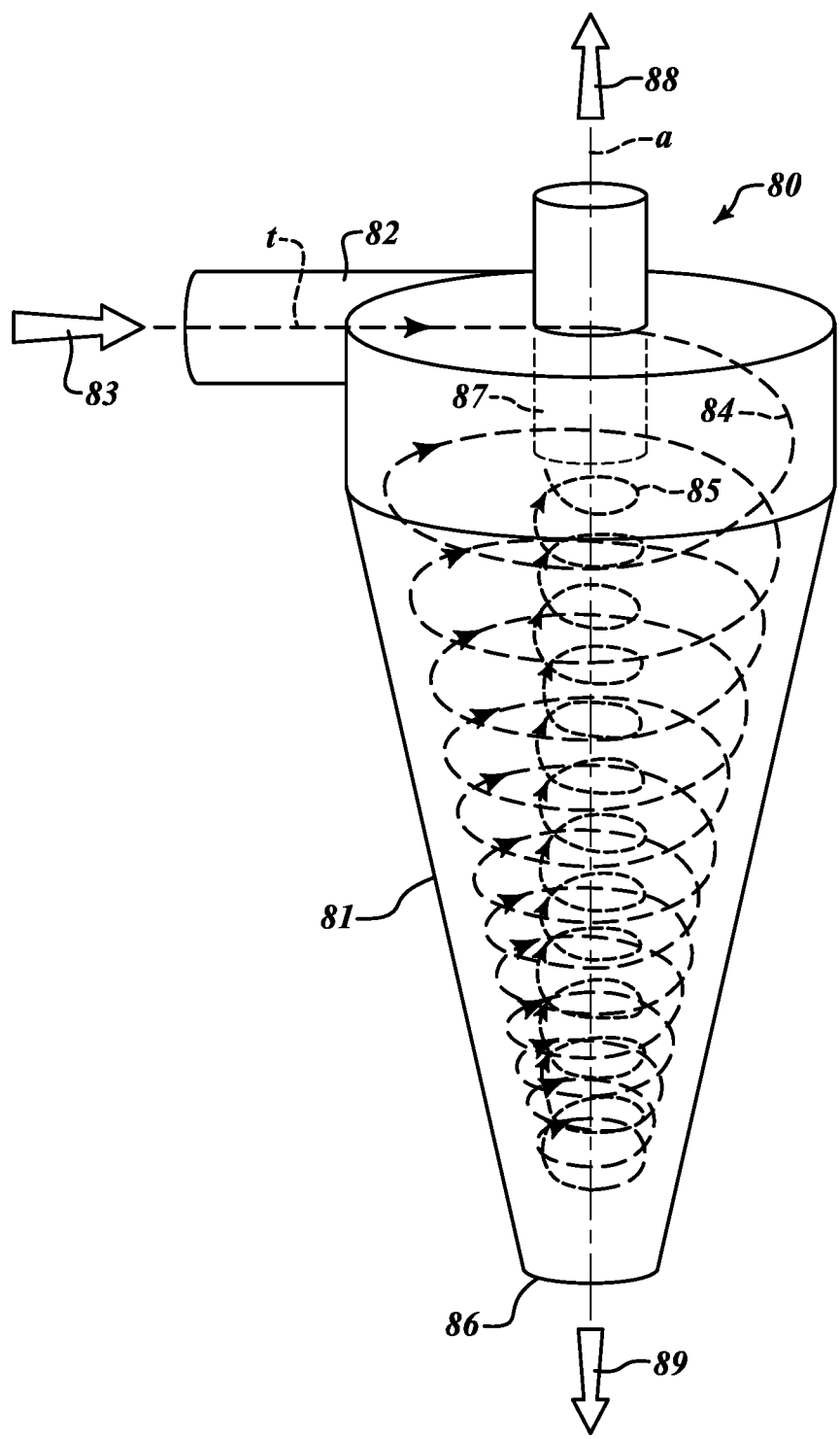
FIG. 4 is a cross-section of a hydrocyclone used to reclaim water from recovered sludge collected from the solar panel surface.

FIG. 4 shows an exemplary hydrocyclone 80 and demonstrates its centrifugal separation principle to remove dust solids suspended in recovered water. The operating principle of the hydrocyclone 80 relies upon a conical vortex-generating cavity 81. Water with suspended dust enters a tangential feed inlet 82 at the top of the cavity 81 wall of the hydrocyclone 80. The tangent t proves to the most efficient direction to exploit most efficiently the kinetic energy motivating the pumped water as it enters the cavity 81. The separated water exits in the cavity 81 through a vortex finder 87 which further enhances the tangential flow and therefore creates both a strong outer vortex 84 traveling downward within the hydrocyclone 80 and an inner vortex 85 of water. The water and dust within the hydrocyclone 80 spins in the high velocity outer vortex 84. As the water flow 88 exits out by the vortex finder 87 (the overflow), the coarse particles simultaneously spiral outward, separated by centrifugal force then to fall through the underflow collect under gravity's influence at the narrow vortex base, the restricted mud port 86. The pressure the outer vortex 84 exerts on the collected particles urges the particles as very much dewatered mud from the restricted mud port 86 in a mud flow 89.

In use, the hydrocyclone's 80 axis a is aligned vertically so gravity will assist in the removal of dust solids as a mud flow 89. The operating principle is simple: the fluid, carrying the suspended particles, enters the cyclone tangentially t by the tangential feed inlet 82. Because the particles in suspension are drawn outward as the flow spirals downward, that circular motion produces a centrifugal field in an outer vortex 84 drawing particles out of the suspension. Larger particles move through the fluid to the outside of the cyclone cavity 81 in a spiral motion, and, thus, to exit through the restricted mud port 86 or spigot with a fraction of the liquid to form a mud flow 89. Due to the limiting area of the restricted mud port 86 or spigot, an inner vortex 85, rotating in the same direction as the outer vortex 84 but flowing upward, is established and leaves the hydrocyclone 80 through the vortex finder 87, carrying most of the liquid and some small finer particles with it.

The outlet at the top of the cavity 81 is called the vortex finder 87 and extends into the hydrocyclone 80 to reduce short-circuit flow directly from the tangential feed inlet 82. At the conical end of the cavity 81 lies the restricted mud port 86 or spigot. For size separation, both outlets are generally open to the atmosphere. Except for the immediate region of the tangential inlet, the fluid motion within the hydrocyclone 80 has radial symmetry. If one or both of the outlets are open to the atmosphere, a low-pressure zone causes a gas core along the vertical hydrocyclone axis a, inside the inner vortex 85. Water from the vortex finder 87 flows into the water reservoir 96 for reuse in washing.

Rooftop Sled Embodiment

Google conducted a groundbreaking experiment at their 1.6 MW solar farm in Mountain View, California. They found that cleaning the solar panels was "the number one way to maximize the energy they produce." Cleaning solar panels that had been in operation for 15 months doubled their output of electricity.

There are multiple reasons why rooftop solar panels increase fall hazards. One reason is that installing and maintaining rooftop solar panels means that workers are simply on the roof more often. When workers install rooftop solar panels, they are at risk of dangerous slips, trips, and falls. Installation of rooftop solar panels also means that there is less walking area around potential fall areas such as skylights and roof hatches. With less space to maneuver, there is danger of falls. With equipment and power lines, there are more trip hazards as well.

Between 2008 and 2014, rooftop solar grew an average of more than 50% per year (U.S. Energy Information Administration (EIA). 2015. Monthly Update May 2015) and continues to grow. But rooftop solar panel system installation and maintenance present potential fall hazards for workers. Because of rooftop fall hazards, the foremost concern in cleaning the panels is to use proactive measures to prevent a fall. Because the area of the solar panel is proportionate to the output of the panel, most installations will be designed to maximize the area relative to the perimeter of the roof upon which the panels are installed. Thus, the area of the roof reserved for the worker is generally minimal relative to that proportion of the area of the roof dedicated to support the panels.

Falls from heights is a leading cause of death to workers, accounting for more than one-third of U.S. construction deaths. In general, the entire rooftop environment dictates a number of safety measures be put in place to prevent falls and fatalities. Roof edges, skylights, and roof hatches near rooftop solar panel arrays each present fall hazards to workers tasked with installation and maintenance. So, there is a legitimate concern about solar panel installation safety for workers on rooftops. FIGS. 5 through 8 depict an embodiment for cleaning of rooftop solar arrays with a man-portable cleaning sled for such environments.

Figure 5:
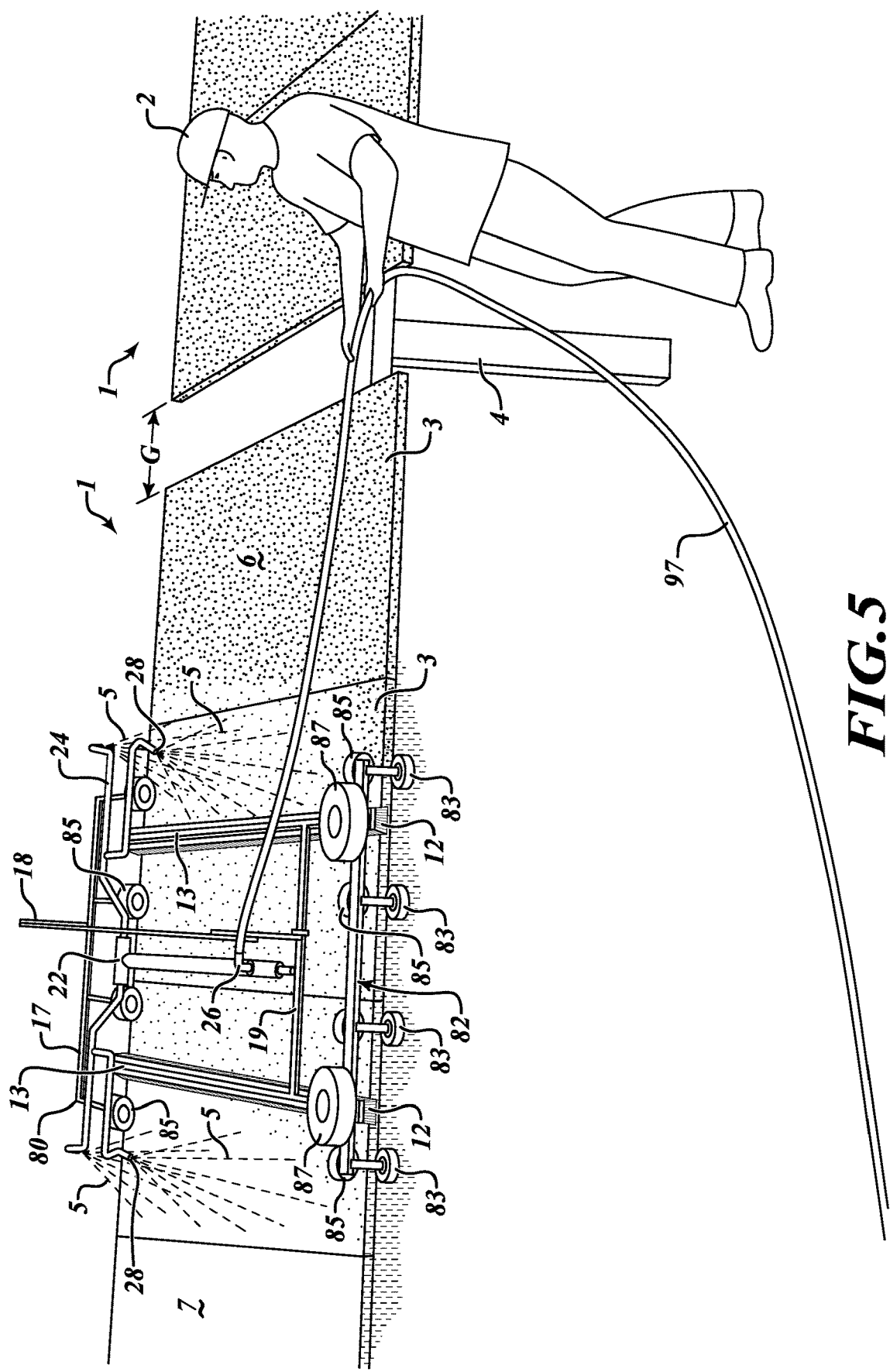
FIG. 5 is an embodiment of the cleaning sled which requires no vehicle for support.

FIG. 5 introduces an embodiment of the cleaning sled which requires no vehicle for support of the brushes over the solar panels. This is a man-portable unit which may be used in any environment but is particularly well-suited for cleaning rooftop solar panel arrays with their narrow passageways between rows of arrays.

FIG. 5 is offered to show some of the features unique to the embodiment. Principal among these distinctions from the previously described embodiment is the reliance upon the user 2 to motivate the sled across the rows of the solar panel array 1. Rather than relying upon the host vehicle 91 of the first described embodiment, the sled relies upon the user 2 pulling the sled by its high-pressure hose 97 as the sled transits the row of panels 3.

The sled embodiment rolls over the solar panels 3 on trolley suspension wheels 85, while the lath brushes 12 cooperate to suspend the sled. The trolley suspension wheels 85 are ganged in each of an upper trolley assembly 80 and a lower trolley assembly 82. The sled is positioned over the panel 3 by each of gangs of lower lateral trolley wheels 83 (in the lower trolley assembly 82) and the upper lateral trolley wheels 81 (in the upper trolley assembly 80).

The sled itself relies upon a framework comprising a pair of parallel washer head frames 13 separated by a upper rail 17 and a lower rail 19. The washer head frames 13 also secure the lath brushes 12 to the sled. These lath brushes 12, because of the resilience of the individual bristles do also serve to help to support the sled as the sled rests on the solar panels 3. As with any brush, the lath brushes 12 do rely upon a downward force, in this case exerted by gravity, to scrub dust particles from the surface of solar panels 3. Given the light weight of the sled and the length of the lath brushes 12, the weight of the sled is never focused enough at any one spot to pose any danger to the solar panels 3.

Water enters the sled through the same high-pressure hose 97 and down through the gooseneck 26 to feed a sprayer manifold 22. In turn, the sprayer manifold 22 divides the flow of water, distributing it to each of a plurality of spray headers 24 which, also in turn, feed water to the several nozzles 28 to spray onto the surface of the solar panels 3 just as described above relative to the first-described embodiment.

To assure the tracking of the sled over the solar panels 3, a backbone 18 is a part of the clamping assembly which selectively engages and disengages the sled from the solar panels 3. The clamping mechanism is disclosed more fully with reference to FIG. 8 below. Nonetheless, it is mentioned here for completeness of the sled assembly as the clamping mechanism exerts a constant pressure to capture the sled in optimal registration with the solar panels 3. Also included for later explanation are truck wheels 87, which will be set forth relative to FIG. 7 below.

Figure 6:
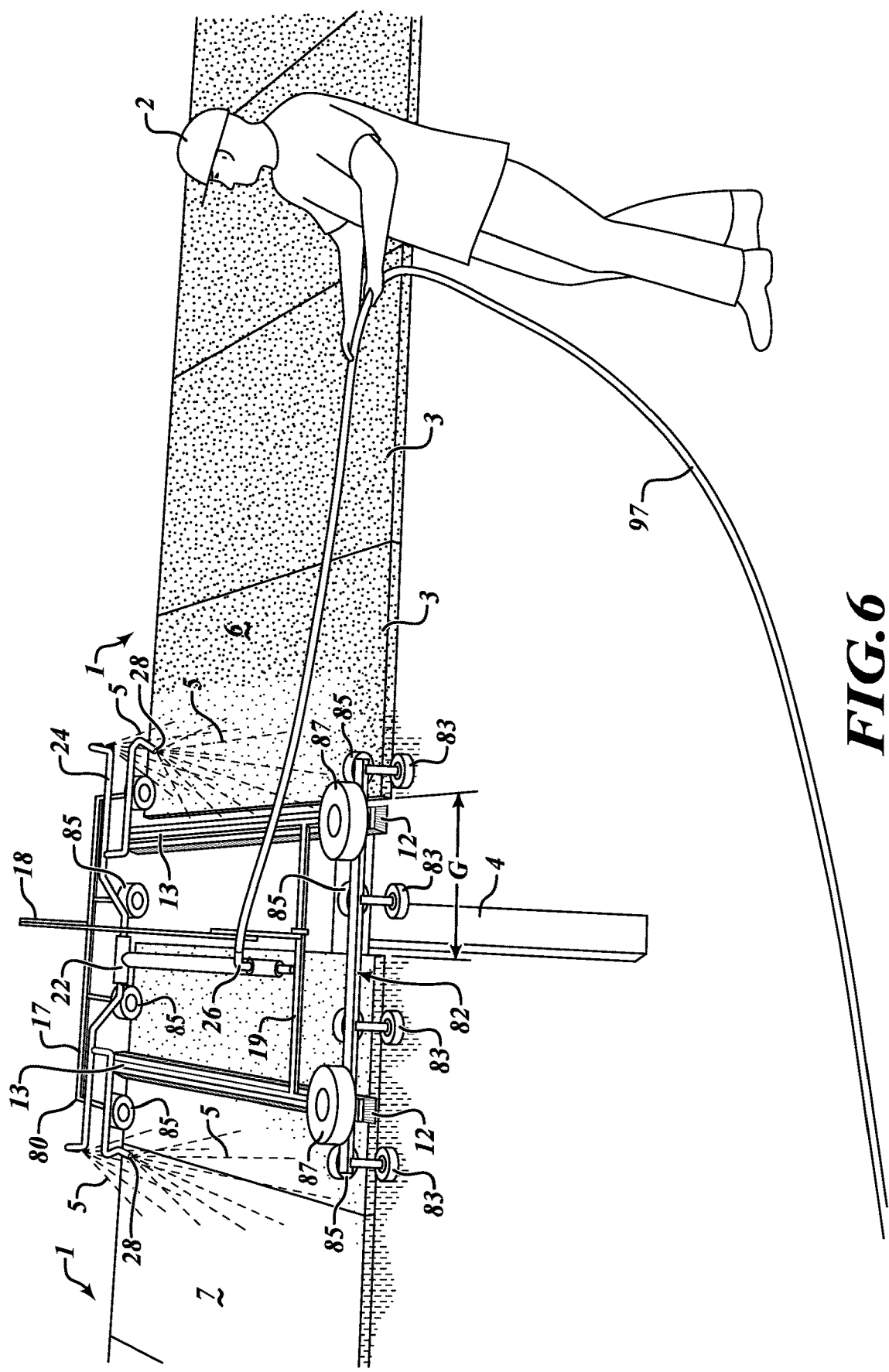
FIG. 6 demonstrates the embodiment of the cleaning sled in use to transit over a gap G in a bank of solar cells.

FIG. 6 demonstrates the embodiment of the cleaning sled in use to transit over a gap G in a bank of solar cells having all the same elements visible as in the preceding FIG. 5. FIG. 6 differs from FIG. 5 in that FIG. 6 depicts the described sled embodiment as it makes the transit from a first solar panel 3 to a second solar panel 3 across a gap G between the panels 3. Each of the upper trolley assembly 80 and the lower trolley assembly 82 comprise a plurality of trolley suspension wheels as well lateral trolley wheels, a plurality of lower lateral trolley wheels 83 in the lower trolley assembly 82 and a plurality of upper lateral trolley wheels 81 in the upper trolley assembly 80.

The spacing of these wheels 81, 83, and 85 is such as to have at least three of each type remain in contact with the two solar panels 3 to maintain the alignment of the trolley assemblies 80, 82 with panels 3 thereby to allow the ready transition from one solar panel 3 to the next solar panel 3. Thus, when the user 2 draws the sled by the high-pressure hose 97 from the first solar panel 3, the first of two trolley suspension wheels 85 (one each from the upper trolley assembly 82 and the lower trolley assembly 80) as well as one each of the upper lateral trolley wheel 81 and lower lateral trolley wheel 83, as these four wheels 81, 83, and 85 enter the gap G, leaving the surface and upper and lower edges of the solar panel 3 simultaneously.

As the user 2 continues to draw the sled along, each of these first group of four wheels 81, 83, and 85 contacts the next solar panel 3 just as a second group of four wheels 81, 83, and 85 leaves the surface and upper and lower edges of the first solar panel. Because at least six of the two trolley suspension wheels 85 and three each of the lower lateral trolley wheels 83 and the upper lateral trolley wheels 81 maintain the upper trolley assembly 80 and the lower trolley assembly 82 in alignment both with the surface and edges of the solar panels 3 making a smooth transition across the gap G to ensure a smooth transition without impediment to the forward movement of the sled.

Figure 7:
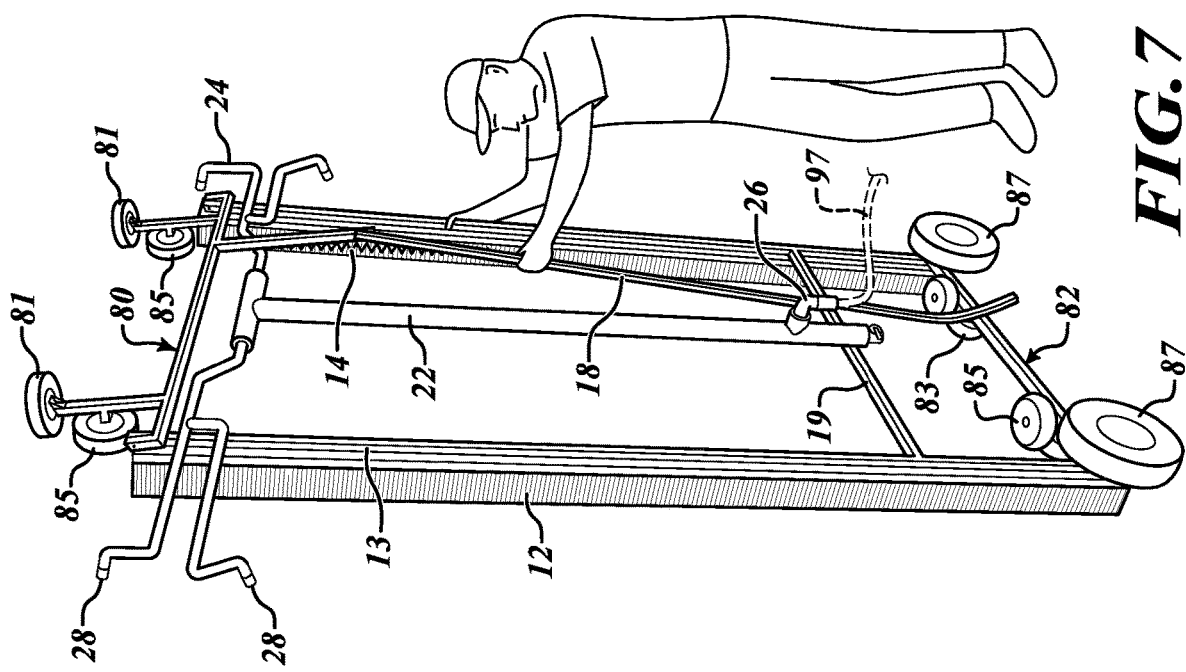
FIG. 7 depicts the embodiment of the cleaning sled to demonstrate its quality as a man-portable device for transportation especially in close environments.

FIG. 7 shows the embodiment of the cleaning sled to demonstrate its quality as a man-portable device for transportation especially in close environments. FIG. 7 is actually not complete in that at least four of the suspension wheels 85, two of the upper lateral trolley wheels 81 and two of the lower trolley wheels 83 have been omitted to allow for greater clarity relative to the pivoting upper trolley assembly 80 and the truck wheels 87 on the lower trolley assembly 82. This omission of the detail is not intended suggest that the absence of these wheels is intended for the presently preferred embodiment of the sled embodiment of the invention. The principal purpose of FIG. 7 is to demonstrate the placement and to explain use of the truck wheels.

As stated, the use of the truck wheels assists a user 2 in maneuvering the sled embodiment especially in close quarters. When tipped up, the sled may be balanced on its pair of truck wheels 87. A class 3 lever has the effort between the fulcrum and the load. Because the load and effort are on the same side, they move in the same direction. In a class 3 lever, the effort is always closer to the fulcrum than the load, so class 3 levers are used to make the load move faster.

The wheels act as a fulcrum that helps distribute and mitigate heavy weight on one side. This lever design makes it easier for the user 2 to push and move heavy, large objects with ease. Once on end, the sled is readily and easily moved through narrow passages. Because the sled is relatively light, the sled itself can be steered by shifting the whole of the weight to one of either of the truck wheels 87 and pivot the sled on that one of the truck wheels 87. Once it is aligned with the intended path, the user 3 can drop the remainder of the weight back on the remaining truck wheel 87. In such a manner, the sled may be moved in constricted spaces readily.

Figure 8:
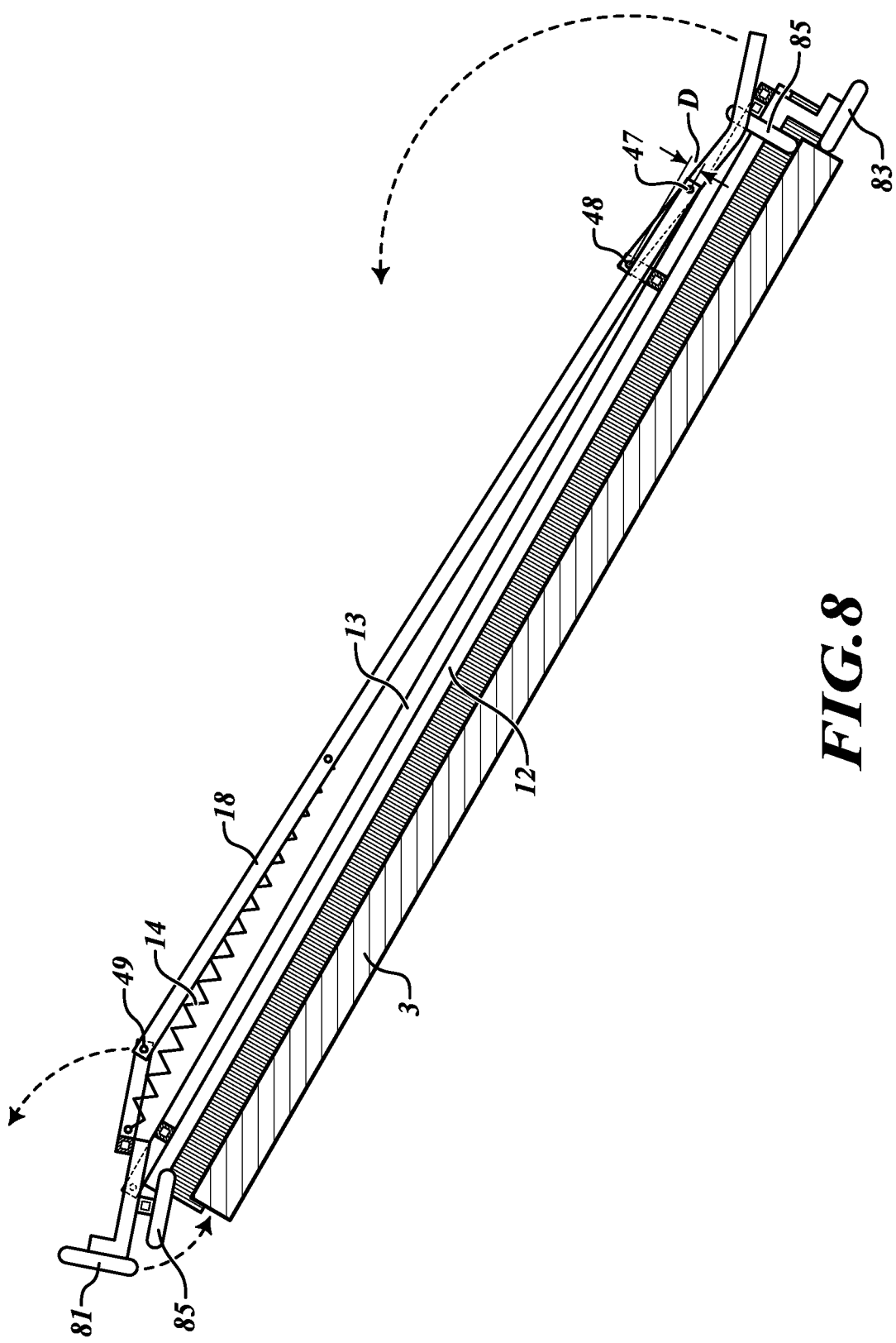
FIGS. 8 and 9 are side views demonstrating the clamping mechanism of the embodiment of the cleaning sled employs enabling the sled in each of a "disengaged" and an "engaged" posture relative to a bank of solar cells.
Figure 9:
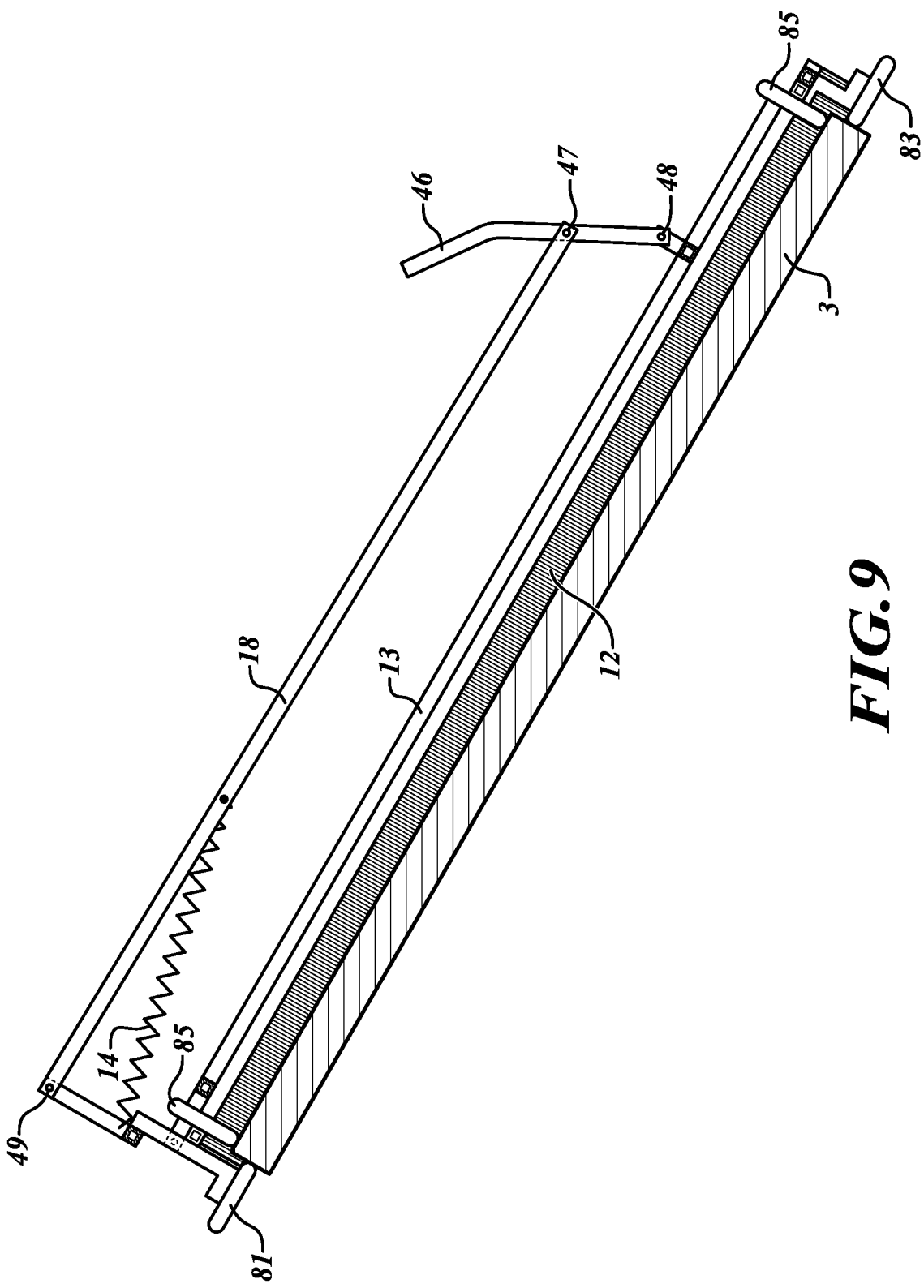

FIGS. 8 and 9 depict the clamping mechanism of the embodiment of the cleaning sled enabling the sled to engage a bank of solar cells in each of an "engaged" position and a "disengaged" position relative to the solar cells. As stated above, the trolley suspension wheels 85 are ganged in each of an upper trolley assembly 80 and a lower trolley assembly 82. The sled is positioned over the solar panel 3 by each of gangs of lower lateral trolley wheels 83 (in the lower trolley assembly 82) and the upper lateral trolley wheels 81 (in the upper trolley assembly 80).

A clamping mechanism includes an axial swivel allowing the upper trolley assembly 80 to rotate from a position wherein the upper lateral trolley wheels 81 contact an upper surface of solar panels 3 to maintain the washer head frame 13 in alignment to the solar panel 3 in an engaged position. This same engaged position is characterized, as well, by the positioning of suspension wheels 85 to roll across a surface of the same solar panel 3. The upper trolley assembly 80 can also rotate about the axis of the upper trolley assembly 80 to draw the upper lateral trolley wheels 81 out of engagement with the upper surface of the solar panel 3. As the upper lateral trolley assembly 80 rotates out of engagement with the solar panel 3, the suspension wheels 85 withdraw from engagement from the surface of the solar cell 3 in the disengaged position. The clamping mechanism comprises a backbone 18 coupled to a cam handle 46 and a cam swivel 48 which, in operation, rotate about a cam pivot 47. The cam handle 46, and the backbone swivel 48 are maintained in parallel relationship by their coupling with each of the backbone 18 and the washer head frame 13. Movement of the cam handle 46 as depicted in FIG. 8, and its parallel counterpart, the backbone swivel 49 serves to move the upper trolley assembly 80 to a position of engagement wherein the trolley suspension wheels 85 and the upper lateral trolley wheels 81 as depicted in FIG. 9. A resilient spring 14 spans from the backbone 18 to the backbone swivel 49 to apply tension tending to draw the upper trolley assembly 80 into engagement with the solar panel 3.

Cam levers (often called cam clamps) are quick-action fastening devices allowing the user to quickly release a workpiece without the use of tools or equipment. Once the lever is threaded onto the application, clamping force is applied by pushing down the lever. Clamping force is released simply by pressing the cam handle and cam lever into the "disengaged" position as depicted in FIG. 8, allowing the sled to be removed from the surface of the solar panel 3. The cam handle 46, when moved to the "engaged" position, as depicted in FIG. 9, as drawn by the resilient spring 14 places the several suspension wheels 85 of the upper trolley assembly 80 onto the surface of the solar panel 3 where the suspension wheels 85 and the lath brushes 12 maintain the spacing between the washer head frame 13 thereby allowing the lath brushes 12 to scrub the surface of the solar panel 3 when the upper trolley assembly 80 is in its "engaged" position as depicted in FIG. 9.

The embodiments of the invention in which an exclusive property or privilege is claimed are defined as follows:

1. A washer head assembly for washing a surface of a solar panel comprising:
   a washer head frame including:
      a washer frame cross member including:
         each of:
            an upper trolley assembly, comprising an upper plurality of suspension wheels and a plurality of upper lateral trolley wheels, and
            a lower trolley assembly, comprising a lower plurality of suspension wheels and a plurality of lower lateral trolley wheels,
         the upper trolley assembly and the lower trolley assembly held in parallel relationship one to another by a plurality of washer head frames connected thereto; and
         affixed on each washer head frame, a lath brush, the lath brush extending, generally, the length of the washer head frame, each lath brush to include a plurality of bristles to support the washer head frame against the surface of the solar panel without damage to the solar panel; and
   a water sprayer manifold assembly, comprising:
      a plurality of spray headers, each spray header including at least one spray nozzle;
      a sprayer manifold defining an interior passage to communicate water to each of the plurality of spray headers and through each spray header to the at least one spray nozzle the spray header includes;
      a gooseneck for connecting a high-pressure hose for communicating a volume of water into the interior passage of the water sprayer manifold.

2. The washer head assembly of claim 1 further comprising:
   a pressurized water line to convey water to the sprayer manifold, the water-line being configured to draw the washer head assembly across a row of solar panels.

3. The washer head assembly of claim 1, wherein:
   the upper trolley assembly includes an axial pivot allowing the upper trolley assembly to rotate axially to, alternately, engage or disengage the plurality of upper lateral trolley wheels with the solar panel.

4. The washer head assembly of claim 3 wherein the axial pivot is further configured:
   to engage and disengage the plurality of upper lateral trolley wheels as the upper trolley assembly is rotated to engage the upper lateral trolley wheels with the solar panel in response to movement of a cam lever assembly.

5. The washer head assembly of claim 3 further comprising:
   the cam lever assembly comprising a cam handle, a cam swivel and a backbone swivel cooperating to rotate the upper trolley assembly to alternately engage or to disengage the upper lateral trolley wheels with the solar panel in response to movement of the cam handle.

6. The washer head assembly of claim 5 further comprising:
   a spring arranged to urge cam lever assembly so as to rotate the upper trolley assembly to engage the upper lateral trolley wheels with the solar panel.

7. The washer head assembly of claim 1 further comprising:
   a plurality of truck wheels rotatably fastened to the washer head frame, the plurality of truck wheels being arranged to support the washer head frame when the washer head frame is oriented to a generally orthogonal orientation to a ground surface, the truck wheels being configured to transport the washer head assembly over the ground surface.

8. A method for cleaning a solar panel comprising:
   suspending a washer head assembly on bristles of a plurality of lath brushes the washer head frame includes, the lath brushes being held in a generally parallel orientation by a washer head frame, the lath brushes extending from an upper trolley assembly to a lower trolley assembly;
   orienting the washer head assembly relative to the solar cell by urging a plurality of upper lateral trolley wheels rotatably fastened to the upper trolley assembly to bear against an upper edge of the solar cell;
   conveying water in a pressurized water line to supply a water sprayer manifold assembly the washer head frame supports;
   distributing water through the water sprayer manifold assembly to each of a plurality of nozzles directed at the solar cell through at least one spray header; and
   drawing the washer head frame along a path parallel to an axis of the upper trolley assembly.

9. The method of claim 8, further wherein:
   drawing the washer head frame includes drawing the pressurized water line to motivate the washer head frame.

10. The method of claim 8 further wherein:
   orienting the washer head assembly relative to the solar cell includes by urging a plurality of lower lateral trolley wheels rotatably fastened in a lower trolley assembly, the lower trolley assembly being connected to the washer head frame against a lower edge of the solar cell which in concert with the urging of the upper lateral trolley wheels clamps the washer head frame in orientation to the solar cell.

11. The method of claim 8 further comprising:
suspending a washer head assembly on bristles of a plurality of lath brushes includes:
rotating the washer head frame to a position generally parallel to a front surface of the solar panel and resting on the bristles of the plurality of lath brushes from an initial position resting on a plurality of truck wheels rotatably fastened to the washer head frame such that in the initial position the plurality of truck wheels support the washer head frame in an attitude of generally orthogonal orientation to a ground surface; and
resting the washer head frame against the front surface of the solar panel such that the bristles of the plurality of lath brushes contact the solar panel front surface.

12. The method of claim 8 further wherein:
conveying water in a pressurized water line to supply a water sprayer manifold assembly includes conveying water through a flexible hose.

13. The method of claim 12 further wherein:
drawing the washer head frame along a path parallel to an axis of the upper trolley assembly includes drawing the washer head frame by pulling the washer head frame by the flexible hose.

14. The method of claim 8 wherein:
drawing the washer head frame along a path parallel to an axis of the upper trolley assembly includes drawing the washer head frame wherein from a first position suspended by suspension wheels resting on a first solar panel to a position to a second position such that the suspension wheels resting on a second solar panel separated from the first solar panel by a gap.

15. A washer head frame for washing a surface of a solar panel, the washer head frame comprising:
a plurality of lath brushes, the plurality of lath brushes together extending, generally, the length of the washer head frame, each lath brush making up the plurality being oriented such that the long axis lies perpendicular to a direction of travel, the lath brushes comprising a plurality of bristles being of sufficient number to support the washer head frame against a front surface of the solar panel without damage to the solar panel; and
arranged within the washer head frame:
a sprayer manifold assembly comprising:
a gooseneck for receiving a connection to a flexible water hose;
a sprayer manifold to receive a high-pressure flow of water from the gooseneck;
at least one spray header to receive the high-pressure flow of water from the sprayer manifold to supply the high-pressure flow to a plurality of nozzles configured to spray the front face of the solar panel.

16. The washer head frame of claim 15 further comprising:
a plurality of truck wheels rotatably fastened to the washer head frame, the plurality of truck wheels being arranged to support the washer head frame when the washer head frame is oriented to a generally orthogonal orientation to a ground surface, the truck wheels being configured to transport the washer head assembly over the ground surface.

17. The washer head frame of claim 15 further comprising:
an upper trolley assembly comprising:
a plurality of suspension wheels; and
a plurality of upper lateral trolley wheels; and
a lower trolley assembly, comprising:
a plurality of suspension wheels and a plurality of lower lateral trolley wheels; and
wherein the upper trolley assembly and the lower trolley assembly held in parallel relationship one to another by a plurality of connections to the washer head frame.

18. The washer head assembly of claim 15, wherein:
the upper trolley assembly includes an axial pivot allowing the upper lateral trolley assembly to rotate axially to, alternately, engage or disengage upper lateral trolley wheels with an upper edge of the solar panel.

19. The washer head assembly of claim 18 further comprising:
a cam lever assembly comprising a cam handle, a cam swivel and a backbone swivel cooperating to rotate the upper trolley assembly to alternately engage or to disengage the upper lateral trolley wheels with the solar panel, the cam lever assembly being configured to rotate the upper trolley assembly in response to.

20. The washer head assembly of claim 18 further comprising:
a spring arranged to urge cam lever assembly to rotate the upper trolley assembly to engage the upper lateral trolley wheels with the solar panel.

* * * * *